US008639734B1

(12) United States Patent
Cook (10) Patent No.: US 8,639,734 B1
(45) Date of Patent: Jan. 28, 2014

(54) USE OF EXTERNAL INFORMATION ABOUT A FILE TO DETERMINE VIRTUALIZATION

(75) Inventor: Randall R. Cook, Springville, UT (US)

(73) Assignee: Symantec Operating Corporation, Mountain View, CA (US)

(*) Notice: Subject to any disclaimer, the term of this patent is extended or adjusted under 35 U.S.C. 154(b) by 853 days.

(21) Appl. No.: 12/059,973

(22) Filed: Mar. 31, 2008

(51) Int. Cl.
 *G06F 12/10* (2006.01)
(52) U.S. Cl.
 USPC .............................. 707/829; 711/165; 718/1
(58) Field of Classification Search
 USPC .................. 707/829, 831; 711/165; 718/1
 See application file for complete search history.

(56) References Cited

U.S. PATENT DOCUMENTS

| 5,313,646 | A | 5/1994 | Hendricks | 1/1 |
|---|---|---|---|---|
| 5,537,539 | A | 7/1996 | Narihiro | 714/38 |
| 5,561,799 | A | 10/1996 | Khalldi | 707/809 |
| 5,586,304 | A | 12/1996 | Stupek, Jr. et al. | 710/170 |
| 5,905,990 | A | 5/1999 | Inglett | 1/1 |
| 5,930,513 | A | 7/1999 | Taylor | 717/174 |
| 5,933,647 | A | 8/1999 | Aronberg et al. | 717/178 |
| 5,983,241 | A | 11/1999 | Hoshino | 1/1 |
| 5,991,402 | A | 11/1999 | Jia | 705/59 |
| 5,991,753 | A | 11/1999 | Wilde | 1/1 |
| 6,055,540 | A | 4/2000 | Snow et al. | 1/1 |
| 6,161,218 | A | 12/2000 | Taylor | 717/174 |
| 6,185,574 | B1 | 2/2001 | Howard et al. | 1/1 |
| 6,195,650 | B1 * | 2/2001 | Gaither et al. | 707/999.001 |
| 6,356,915 | B1 | 3/2002 | Chtchetkine | 707/823 |
| 6,366,900 | B1 | 4/2002 | Hu | 1/1 |
| 6,374,402 | B1 | 4/2002 | Schmeidler et al. | 717/167 |
| 6,381,735 | B1 | 4/2002 | Hunt | 717/158 |
| 6,453,468 | B1 | 9/2002 | D'Souza | 717/168 |
| 6,519,626 | B1 * | 2/2003 | Soderberg et al. | 709/203 |
| 6,571,280 | B1 * | 5/2003 | Hubacher | 709/217 |
| 7,013,289 | B2 | 3/2006 | Horn et al. | 705/26 |
| 7,146,429 | B2 | 12/2006 | Michel | 709/238 |
| 7,546,319 | B1 | 6/2009 | Srinivasan et al. | 1/1 |
| 2001/0014892 | A1 * | 8/2001 | Gaither et al. | 707/200 |
| 2002/0019941 | A1 * | 2/2002 | Chan et al. | 713/185 |
| 2002/0157089 | A1 | 10/2002 | Patel et al. | 717/178 |
| 2002/0174215 | A1 | 11/2002 | Schaefer | 709/224 |
| 2003/0033441 | A1 | 2/2003 | Forin et al. | 719/315 |
| 2003/0233489 | A1 * | 12/2003 | Blaser et al. | 709/328 |

(Continued)

OTHER PUBLICATIONS

Jeff Tranter, "CD-ROM and Linux", Linux Journal—Cross-Platform-Linux, Solaris, Windows, CE & More, Nov. 11, 1994. Retrieved from the Internet:<URL:http://vvww.linuxjournal.com/article/2851.

(Continued)

*Primary Examiner* — Christyann Pulliam
*Assistant Examiner* — Sheryl Holland
(74) *Attorney, Agent, or Firm* — Campbell Stephenson LLP (57) ABSTRACT

An apparatus or method in which information external to a file is used to select a directory within a file system where the file is to be stored. In one embodiment of the method a first request is received to create a first file in a file system, wherein the first request comprises a first file system path. First information is also received that describes data contained in a first data object. A first redirect file system path component is selected from a plurality of redirect file system path components in response to receiving the first information. The first file system path is then modified by adding the first redirect file system path component to the first file system path.

11 Claims, 10 Drawing Sheets

(56) References Cited

U.S. PATENT DOCUMENTS

| | | | |
|---|---|---|---|
| 2003/0233490 A1 | 12/2003 | Blaser et al. | 719/328 |
| 2003/0233647 A1 | 12/2003 | Blaser et al. | 717/174 |
| 2004/0073691 A1* | 4/2004 | Sun | 709/230 |
| 2004/0098415 A1* | 5/2004 | Bone et al. | 707/200 |
| 2004/0267752 A1* | 12/2004 | Wong et al. | 707/9 |
| 2005/0091187 A1 | 4/2005 | Madhavarapu et al. | 707/1 |
| 2005/0091226 A1* | 4/2005 | Lin et al. | 707/100 |
| 2005/0097133 A1* | 5/2005 | Pham et al. | 707/104.1 |
| 2005/0165849 A1* | 7/2005 | Moradi et al. | 707/104.1 |
| 2005/0169073 A1 | 8/2005 | Cook et al. | 365/202 |
| 2005/0172279 A1 | 8/2005 | Cook et al. | 717/162 |
| 2005/0257265 A1 | 11/2005 | Cook et al. | 726/23 |
| 2005/0257266 A1 | 11/2005 | Cook et al. | 726/23 |
| 2006/0080353 A1* | 4/2006 | Miloushev et al. | 707/102 |
| 2006/0143703 A1* | 6/2006 | Hopen et al. | 726/15 |
| 2006/0206511 A1 | 9/2006 | Picon et al. | 707/102 |
| 2006/0282440 A1* | 12/2006 | Fletcher et al. | 707/100 |
| 2009/0150462 A1* | 6/2009 | McClanahan et al. | 707/204 |
| 2010/0005072 A1* | 1/2010 | Pitts | 707/3 |

OTHER PUBLICATIONS

Jeff Tranter, "The Linux CD-ROM HOWTO", v. 1.2, Aug. 21, 1994. Retrieved from the Internet http://v\rWW.ibiblio.org/pub/historic-linux/ftp-archives/sunsite.unc.edu/Nov-0 6-1994/docs/HOWTO/CDROM-HOWTO>.

ifs.5.1.tar.gz source code tarball, retrieved from the Internet:<URL:http/www.ibiblio.org/pub/historic-linux/ftp-archives/tsx-11.mitedu/Oct-07-1996/ALPHA/ifs/>.

ovlfsl.O.src.tgz source code tarball, retrieved from the Internet<URL:http://www.ibibllo.org/pub/Linux/system/filesystems/>.

Newcomb, "Softricity has cure for app conflict blues", Thin Planet website, May 2002, parts 1 and 2, Jupitermedia Corp.

"SystemGuard", www.softricity.com website, Apr. 24, 2003 or earlier.

"SoftGrid for Windows Desktops Transforms Business Applications into Web-enabled services, reshaping the economics of enterprise . . . ", www.softricity.com website, Oct. 15, 2001.

"Softricity secures $14.6 million in oversubscribed third round venture funding", www.softricity.com website, May 28, 2002.

"Microsoft and Softricity announce agreement to manage existing Windows applications with web services", www.softricity.com website, May 28, 2002.

"Softricity announces SoftGrid 2.0 first customer deployments and general availability", www.softricity.com website, May 6, 2002.

"Softricity unveils SoftGrid Dual-Mode", www.softricity.com website, Mar. 24, 2003.

"Softricity becomes premier member of Citrix Business Alliance", www.softricity.com website, Feb. 25, 2002.

"SoftGrid Sequencer", www.softricity.com website, Apr. 24, 2003 or earlier.

Longwell, "Softricity lowers price on Dual-Mode deployments", www.crn.com website, Mar. 28, 2003.

"Microsoft and Softricity announce agreement to manage existing Windows-based applications with Web services", a Microsoft website, May 28, 2002.

"Softricity Data Sheet: Softricity SystemGuard: The foundation for stable on-demand application access", www.softricity.com website, Feb. 2002.

"Softricity Data Sheet: Softricity's patent-pending technology enables any application to run on any desktop . . . ", www.softricity.com website, Oct. 2002.

Turning software into a service: there are no silver bullets, www.softricity.com website, Apr. 24, 2003 or earlier.

"Softricity acquires intellectual property of Seaport Software to extend virtual installation technology", www.choicesolutions.com website, Nov. 18, 2002.

"Softricity SoftGrid Platform: Softricity platform training guide", www.softricity.com website, Apr. 24, 2003 or earlier.

"Clean Slate", http://www.fortres.com/products/cleanslate.htm, Jan. 13, 2004.

"FAQ—2001013", http://www.fortres.com/support/faqviewarticle.asp?ID=2001013, Oct. 24, 2003.

"FAQ—2001014", http://www.fortres.com/support/faqviewarticle.asp?ID=2001014, Nov. 25, 2003.

"FAQ—2001015", http://www.fortres.com/support/faqviewarticle.asp?ID=2001015. Nov. 23, 2003.

"FAQ—2001025", http://www.fortres.com/support/faqviewarticle.asp?ID=2001025, Dec. 15, 2003.

Fortres Grand Corporation, "Computer Security Software—A Lifesaver for Schools", www.fortres.com, May/Jun. 2001 (presumed from presented article: periodical not available).

"Clean Slate FAQ", http://www.fortres.com/product/cleanslate faq.htm, Jan. 13, 2004.

"Awards", http://www.fortres.com/products/awards.htm#cleanslate, Jan. 13, 2004.

Microsoft Windows NT Resource Kit, 1993, Microsoft Press, vol. 1, pp. 325-346.

Heidemann, J.S., File-System Development with Stackable Layers, Feb. 1994, ACM Transactions on Computer Systems, vol. 12, No. 1, pp. 58-89.

* cited by examiner

| Capture Criteria | Redirect Path Component |
|---|---|
| Documents Containing Confidential Information | RDR\L1 |
| Data Created Between 8:00 – 11:30 AM | RDR\L2 |
| Pictures of Birds | RDR\L1 |

Fig. 4B

| Capture Criteria | Redirect Path Component |
|---|---|
| Documents Containing Confidential Information | RDR\L1 |
| Pictures of Birds | RDR\L3 |

Fig. 4C

| Capture Criteria | Redirect Path Component |
|---|---|
| Documents Containing Confidential Information | RDR\L1 |
| Data Created Between 8:00 – 11:30 AM | RDR\L2 |
| Pictures of Birds | RDR\L3 |
| Metadata Author-IP Set to EAS | RDR\L4 |

Patents/L4

| Capture Criteria | Redirect Path Component |
|---|---|
| Data Created With Author-ID Set to EAS | RDR\L4 |

Birds/L3

| Capture Criteria | Redirect Path Component |
|---|---|
| Pictures of Birds | RDR\L3 |

Daily Morning Production/L2

| Capture Criteria | Redirect Path Component |
|---|---|
| Data Created Between 8:00 AM and 11:30 AM | RDR\L2 |

Confidential Matters/L1

| Capture Criteria | Redirect Path Component |
|---|---|
| Documents That Contain Confidential Information | RDR\L1 |

Fig. 7

USE OF EXTERNAL INFORMATION ABOUT A FILE TO DETERMINE VIRTUALIZATION

BACKGROUND OF THE INVENTION

In computing, a file system is a mechanism for organizing and storing files to make it easy to later find and access them. File systems are typically organized as a hierarchical structure of directories and files in which each directory may contain one or more files and/or underlying directories. A root directory is usually the first or top most directory in a hierarchy. It can be likened to the root of a tree—the starting point where all branches originate.

A directory's location or a file's location in the file system hierarchy can be represented by a file system pathname (hereinafter path). Paths typically consist of a string of characters that name directories or files, separated by delimiting characters, most commonly the slash or the backslash. For example, the path "C:\patents\application.doc" identifies a file named "application.doc" that is stored in a directory named "patents" on the root director of a disk drive represented by "C:." The root directory is represented by the first backslash "\," and the colon ":" is used to determine the mount point/drive.

A path can be either absolute or relative. An absolute path is usually written with reference to a root directory. A relative path is usually written relative to the current working directory, so the absolute path need not be given. The present invention will be described with reference to absolute paths, it being understood the present invention should not be limited thereto. Many different formats exist for defining paths of files or directories, depending on the file system used. The present invention will be described with reference to the Microsoft Windows style of defining paths, it being understood that paths should not be limited thereto. The path "C:\patents\application.doc" noted above is an example of a Windows style path.

A file system is typically managed by software (hereinafter referred to as a file system manager), which is often a part of an operating system. Traditional file system managers offer facilities to create, open, move, rename, delete, etc., both files and directories. The most familiar file systems make use of one or more data storage devices (e.g., disk drives) that offer access to an array of fixed sized blocks of physical memory, generally a power of two in size (512 bytes are common). The file system manager is often responsible for organizing blocks of physical memory into files and directories. File system managers usually employ mechanisms (e.g., file allocation tables (FATs)) of some sort for keeping track of which blocks of physical memory belong to which files and which blocks of physical memory are not being used.

Bookkeeping information (i.e., metadata) is typically associated with each file within a file system. The length of the data contained in a file may be stored as a number of physical memory blocks allocated for the file or as an exact byte count. The time the data file was first created may be stored as the file's creation time stamp. The time the data file was last modified may be stored as the file's modification time stamp. The time that the file's metadata was last changed may also be stored as metadata. Other metadata may include the file's device type (e.g., block, character, socket, subdirectory, etc.), its owner user-ID and/or group-ID, the ID of author who first created the data of the file or the file itself, and file access permission settings (e.g., whether the file is read-only, executable, etc.). As an aside, an executable file, in computer science, is a file whose contents are meant to be interpreted as a program by a computer. Most executable files contain the binary representation of machine instructions of a specific process. Some operating systems designate executable files by a specific naming convention, such as ending a filename with the extension .bin or .exe. The present invention will be described with reference to files that store data, not executable instructions, it being understood that the present invention should not be limited thereto. For the purposes of explanation, file metadata (e.g., length of file, modification time stamp, creation time stamp, etc.) will be considered external information or information that is separate from its file.

A file system is usually an integral part of any modern operating system. An interface is usually provided by the operating system between a user and the file system. This interface can be textual or graphical, such as provided by a graphical user interface (GUI), such as file browsers. File browsers are useful for speeding up user interaction with files. When displayed in the browser GUI, the files are typically shown in a graphical representation of the hierarchy.

SUMMARY OF THE INVENTION

An apparatus or method is described in which information external to a file is used to select a directory within a file system where the file is to be stored. In one embodiment of the method a first request is received to create a first file in a file system, wherein the first request comprises a first file system path. First information is also received that describes data contained in a first data object to be stored in the first file. A first redirect file system path component may be selected from a plurality of redirect file system path components based on the first information. The first file system path is then modified by adding the first redirect file system path component to the first file system path.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The present invention, in one embodiment, relates to a method and apparatus for selecting a directory within a file system where a file is to be stored. The selection is made using information that is external to the file. The present invention will be described with reference to selecting a directory for file storage when the file is first created, it being understood that the present invention should not be limited thereto. Indeed, the invention could be employed when relocating an existing file, wherein the relocation decision is made based on information that is external to the file. The file system described herein will use a single disk drive of a computer system. Lastly, the present invention will be described with reference to a virtual file system (more fully described below), it being understood that the present invention should not be limited thereto.

In the following description, an embodiment of the present invention can be implemented as software executing on a central processing unit of the computer system, although those skilled in the art will readily recognize that the equivalent may be constructed in hardware or a combination of hardware and software. If the invention is implemented as software executing on a central processing unit, the software may be stored as executable instructions in one or more conventional computer readable mediums that may include, for example: magnetic storage media such as a magnetic disk (e.g., a disk drive); optical storage media such as an optical disk; solid state electronic storage devices such as random access memory (RAM), or read-only memory (ROM); or any other device or medium employed to store computer executable instructions.

Figure 1:
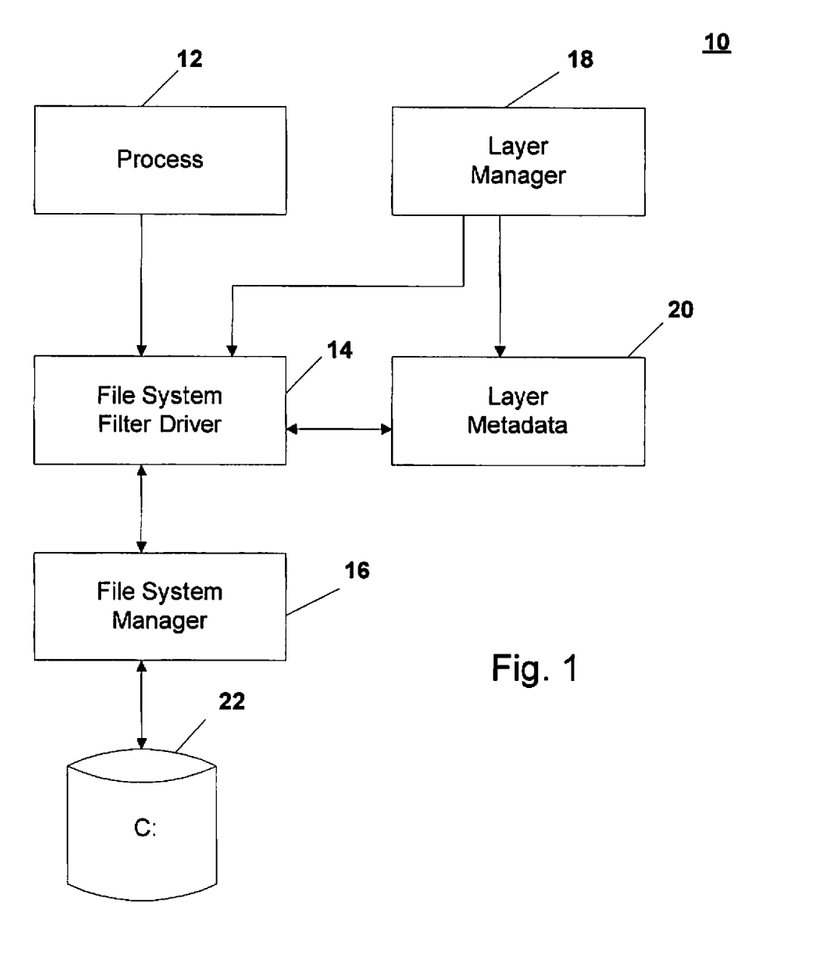
FIG. 1 illustrates a block diagram of relevant components of a computer system.

FIG. 1 illustrates in block diagram form, relevant components of a computer system 10 employing one embodiment of the present invention. The computer system 10 includes components 12-18, each of which may take form in instructions executing on a central processing unit (not shown). Computer system 10 also includes a memory storage device 20 for storing layer metadata (more fully described below) and a disk drive 22 for storing file data. As shown, a file system filter driver (driver) 14 is coupled between a process 12 and a file system manager 16. Driver 14 is also coupled between a layer manager 18 (which will be more fully described below) and file system manager 16. FIG. 1 shows driver 14 in data communication with layer metadata of memory 20. Although FIG. 1 shows several components that are coupled directly together, the term coupled should not be limited thereto. For example, FIG. 1 shows process 12 that is directly coupled to driver 14, but intervening components such as an application program interface (API) and an input/output (I/O) manager executing on the CPU, may be coupled in series between process 12 and driver 14.

Figure 2A:
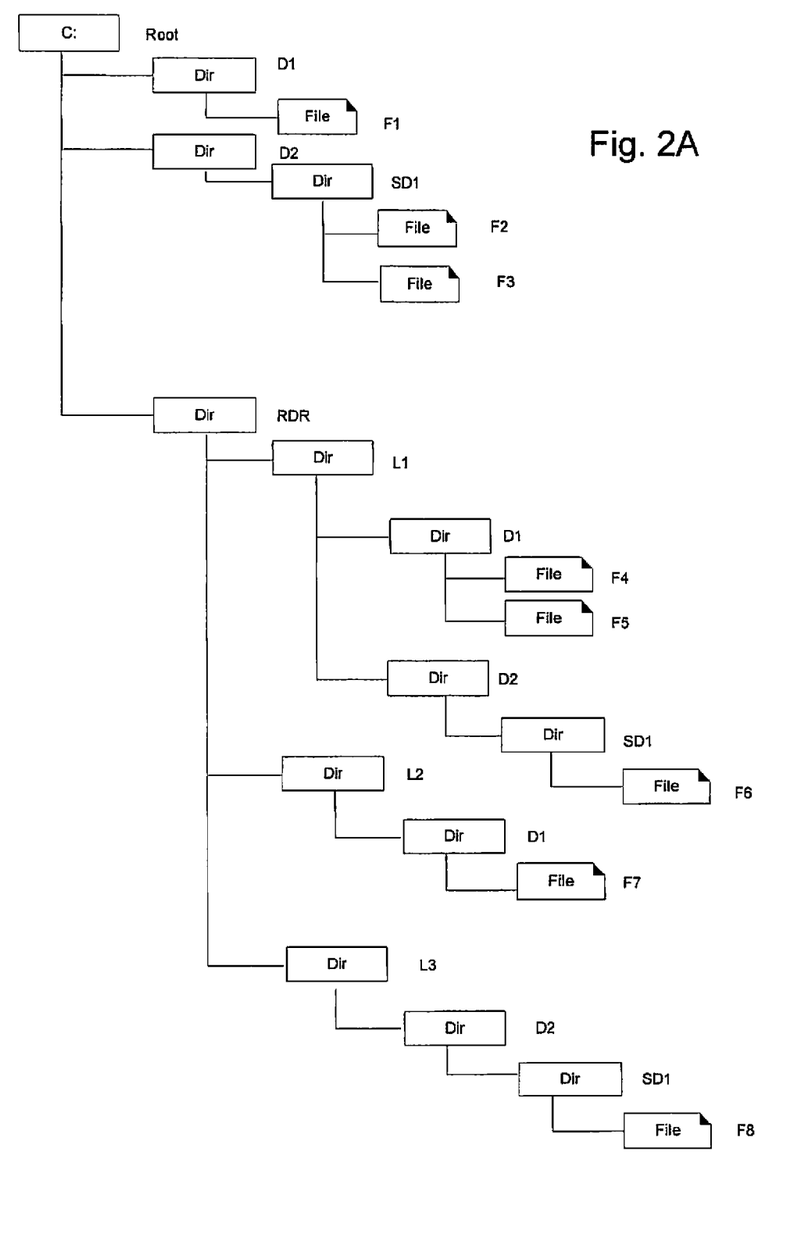
FIG. 2A illustrates a graphical representation of an example file system employed in the computer system of FIG. 1.

File system manager 16 manages a file system. FIG. 2A is a graphical representation of an example file system managed by file system manager 16. The example file system is hierarchical in structure and includes directories and data files. Each directory is identified by a directory name. For example, FIG. 2A's file system includes directories named RDR, D1 and D2, each of which is a subdirectory of the root directory named "Root." The RDR directory consists of subdirectories "L1"-"L3." As used herein, one directory is a subdirectory of another directory if there are no intervening directories therebetween. For example, directory RDR is a subdirectory of Root, and directories L1-L3 are subdirectories of RDR, but directories L1-L3 are not subdirectories of Root, even though L1-L3 are contained within Root. Directories L1-L3 are also herein referred to as "layers." As will be more fully described below, each layer (e.g., L1) within RDR stores only those files, which contain data that relates to external information that matches a respective capture criterion. Capture criteria defines an aspect of files that are stored in a layer, as will be more fully described below.

As noted, file systems contain data files, which in turn contain data. While it is said that files contain data, in reality, the data is stored in physical memory blocks of disk drive 22. File system manager 16 may employ a FAT, which maps logical memory space of the file system to respective physical blocks of disk drive 22. The FAT enables the file system manager 16 to operate on files contained within the file system in accordance with file system requests that are received from process 12 via driver 14. Example requests include: a file system request to create a new file into which data may be stored; a file system request to open an existing file for subsequent read or write access; a file system request to move an existing file from one directory to another directory; a file system request to delete a file from the file system, etc. Each of these requests should include a path of the file of interest. For example, file system manager 16 may receive a request to open file F1. This request should include "C:\D1\F1," the path of F1 within the file system shown in FIG. 2A. Filenames are a special kind of character string used to identify a file stored on the file system. The present invention will be described with reference to filenames containing two parts: the base name (the primary filename) and the extension (usually indicating the file type). The extension indicates the content format or type of data (e.g., .xls, .exe, .doc, .mpeg, etc.) in the file.

As noted above, file system manager 16 receives file system requests via driver 14. In some situations, driver 14 may modify the file path contained in the file system request received from processor 12, before the request is subsequently sent to file system manager 16. In particular, as will be more fully described below, for certain file system requests driver 14 may add a "redirect path component."

Figure 3A:
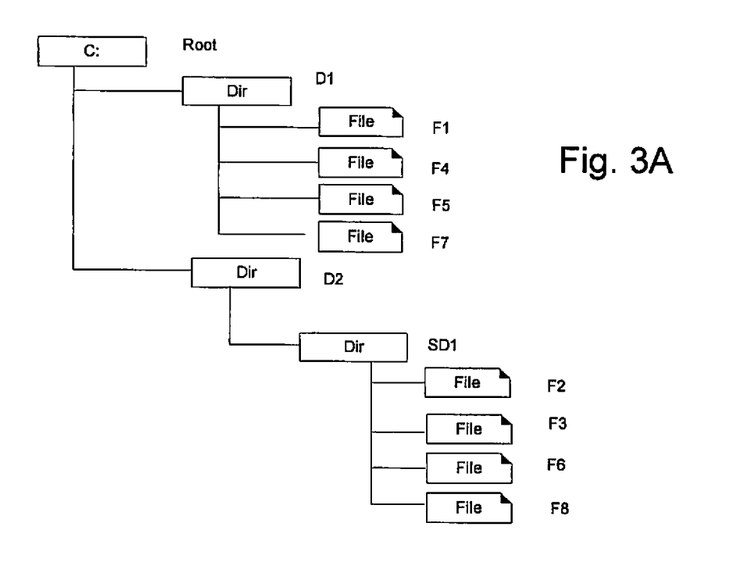
FIG. 3A illustrates a graphical representation of an example virtual file system employed in the computer system of FIG. 1.

While FIG. 2A illustrates an example, graphical representation of the file system managed by file system manager 16, FIG. 3A illustrates an example, graphical representation of the file system as seen by process 12 or as seen by user via a browser GUI (not shown in FIG. 1). The file system shown in FIG. 3A represents a virtualization of the file system shown in FIG. 2A. For purposes of explanation, the file system shown in FIG. 3A will be referred to as the "virtual file system."

The virtual file system of FIG. 3A is a hierarchical structure of directories and files. All data files shown in the file system of FIG. 2A are likewise shown in the virtual file system of FIG. 3A. A comparison of FIG. 3A's virtual file system and FIG. 2A's file system reveals that several directory names are commonly used. For example, the root directory "Root" in FIG. 3A's virtual file system, contains subdirectories D1 and D2. FIG. 2A's file system also contains a root directory named "Root," which contains subdirectories D1 and D2. There are differences between the virtual file system of FIG. 3A and the file system of FIG. 2A. For example, the Root directory of FIG. 2A's file system contains subdirectory RDR; however, the Root directory of the virtual file system shown in FIG. 3 does not contain subdirectory RDR. A comparison of the file systems reveals additional differences. In the virtual file system of FIG. 3A, the path for file F6 is C:\D2\SD1\F6. In the file system shown in FIG. 2A, the same file is located by the path C:\RDR\L1\D2\SD1\F6. "RDR\L1" is an example of a "redirect path component."

Figure 4A:
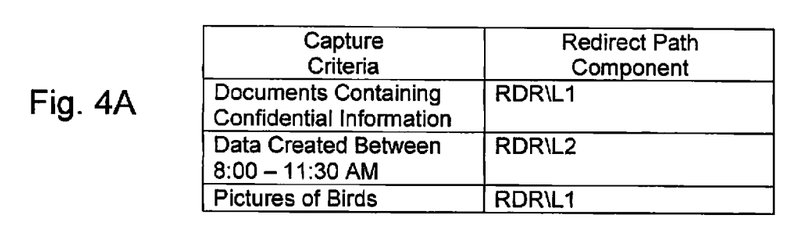
FIGS. 4A-4C illustrate graphical representations of an activation list employed in the computer system of FIG. 1.

As noted above, driver 14 modifies the file path contained in select file system requests that are received from process 12. In one embodiment, driver 14 selects requests for path modification using an activation list. FIG. 4A is a graphical representation of an example activation list employed by driver 14. The activation list shown in FIG. 4A can be stored in memory (not shown) that is accessible by driver 14. The creation of the exemplary activation list will be more fully described below with reference to layer manager 18 and layer metadata 20. However, as can be seen in FIG. 4A, the activation list contains entries that map capture criteria (more fully described below) to respective redirect path components.

Figure 5:
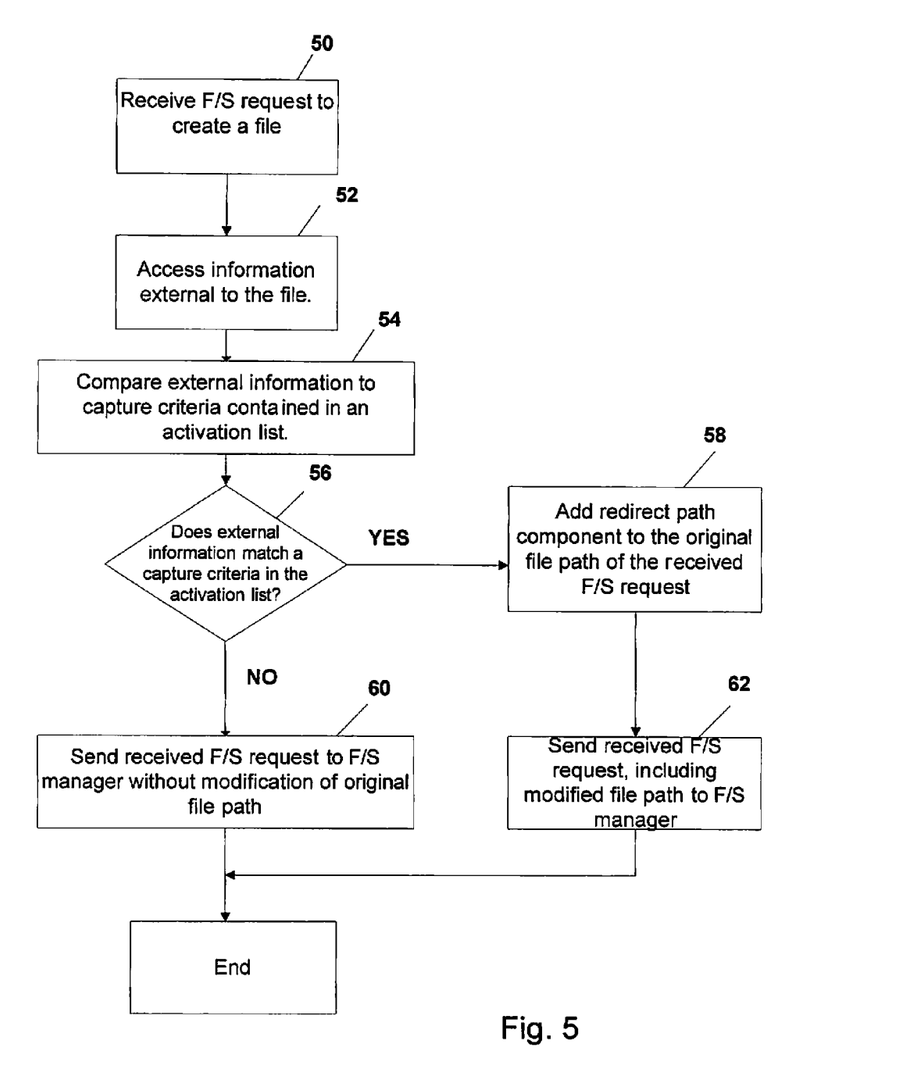
FIG. 5 illustrates relevant components of a process implemented in the computer system of FIG. 1.

Driver 14 can use the activation list shown in FIG. 4A to determine which file system requests should be modified before being sent to file system manager 16. FIG. 5 illustrates relevant aspects of the process employed by driver 14 for making this determination. The process of FIG. 5 will be described with reference to driver 14 receiving a request to create a new file to store data, it being understood that the process applies equally to file system requests to other file system requests.

Figure 2B:
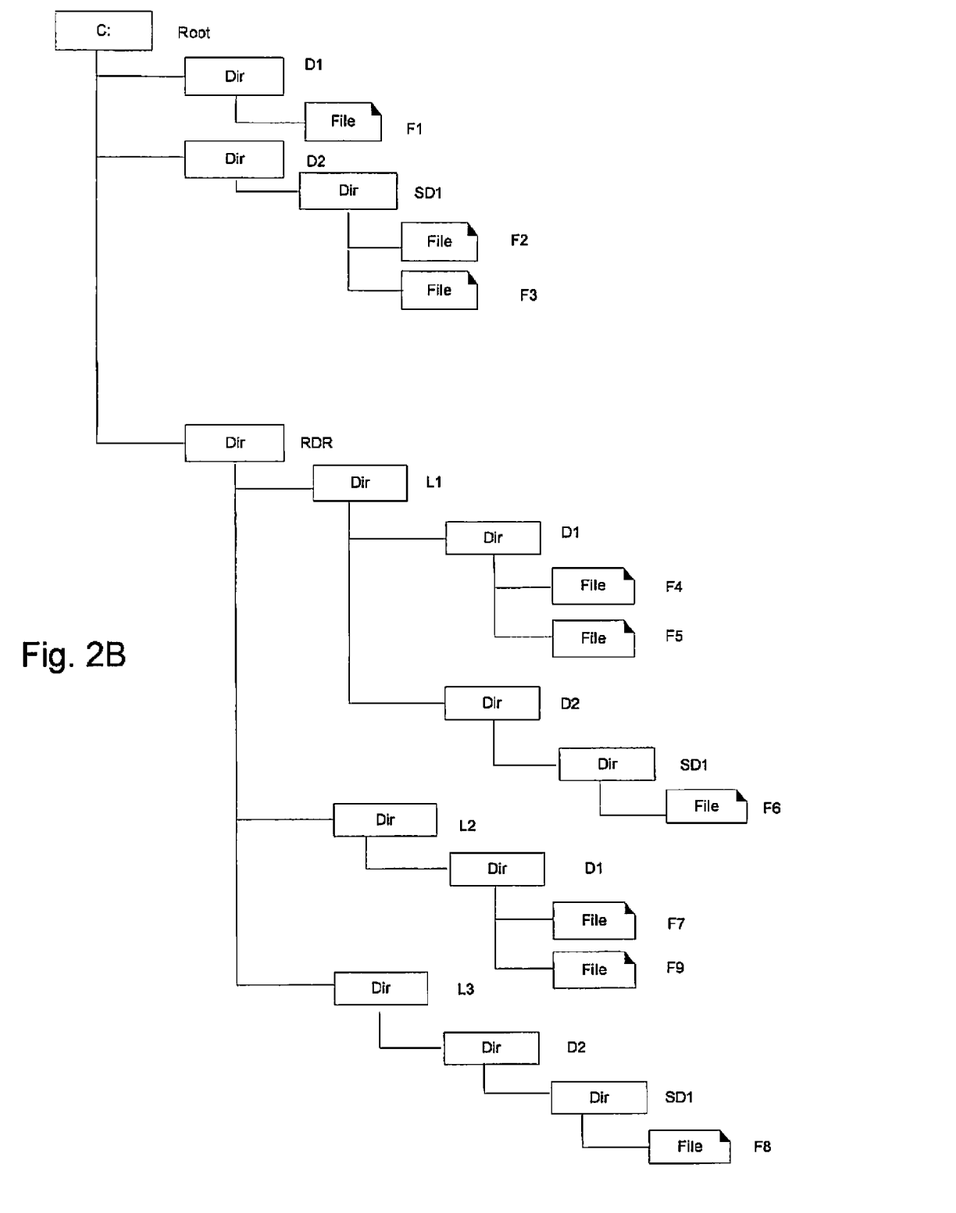
FIGS. 2B and 2C illustrate the file system of FIG. 2A after modification thereof.
Figure 3B:
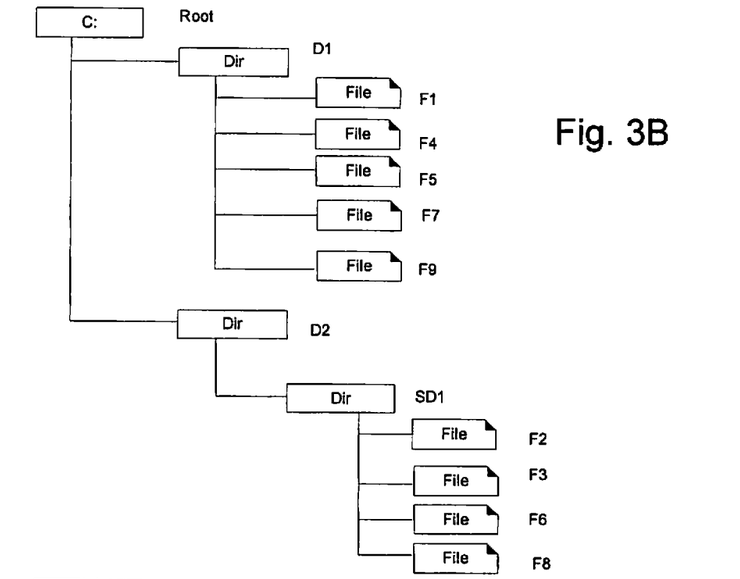
FIGS. 3B and 3C illustrate the file system of FIG. 3A after modification thereof.

The process of FIG. 5 starts with step 50 when driver 14 receives a file system request from process 12 to create a new file to store data. For example, driver 14 may receive a file system request to create new file F9 to be stored in directory D1 of the virtual file system of FIG. 3A. Again, it is noted that virtual file system of FIG. 3A is seen by process 12, not the file system shown in FIG. 2A. Because process 12 is presented with a virtual file system, the example request from process 12 will include the file path "C:\D1\F9." In step 52, driver 14 accesses its activation list (e.g., the activation list shown in FIG. 4A) to determine if the list contains an entry with capture criteria that matches or substantially matches external information about the data to be stored in file F9. If the external information associated with the request matches the capture criteria of an entry, then driver 14 redirects the received request by modifying the path of the received request by, for example, adding the redirect path component that is contained in the activation list entry and mapped to the matching capture criteria. In the example, driver 14 accesses FIG. 4A's activation list to determine if external information associated with data to be stored in file F9, matches the capture criteria of an entry within the activation list. Presume the external information associated with file F9 does match the capture criteria "Data Created Daily Between 8:00 AM and 11:30 AM" of the second entry within the activation list. As such, driver 14 modifies the original path C:\D1\F9 of the request by adding the redirect path component RDR\L2 of the second entry thereby resulting in the modified path C:\RDR\L2\D1\F9. Once the original path is modified, driver 14 sends the request to file system manager 16 for further processing. FIGS. 2B and 3B illustrate the file system and virtual file systems of FIGS. 2A and 2B after file system manager 16 creates file F9 in the file system.

The foregoing description presumes the entire file system of FIG. 2A is stored on disk drive 22. In an alternative embodiment, directory RDR may be stored in a memory device separate and apart from disk drive 22. For example, directory RDR may be stored on a separate disk drive (not shown) of computer system 10, a removable media (not shown) of computer system 10, or a storage device (e.g., disk array, not shown) coupled to computer system 10 via a network (not shown). If RDR is stored on a separate storage device, and driver 14 modifies a request because external information matches a capture criteria, the original path of the request should require additional modification when compared to that described above. More particularly "C:," the identification of disk drive 22 of the original path of the request, should also be replaced with an identification of the separate storage device that stores directory RDR. To illustrate using the above example, presume RDR is stored on a removable media, which is identified by "F:." When driver 14 receives the request to create file F9, which includes original path C:\D1\F9, driver 14 should replace "C:" with "F:" in the path in addition to adding redirect path component RDR\L2, thereby creating redirect path "F:\RDR\L2\D1\F9.

If the activation list lacks an entry with capture criteria that matches the external information about the data, then driver 14 sends the received request to file system manager 16 without modification of the file path. To further illustrate the process shown in FIG. 5, presume driver 14 receives a file system request to create file F10 to store data. This example file system request should include the file path "C:\D1\F10." Presume the activation list lacks capture criteria that matches any component of external information that describes the data to be stored in file F10. Because the activation lacks a match, driver 14 will not modify the original path, and the request to create file F10 will be sent to file system manager 16 for further processing as is.

With continuing reference to FIG. 2A (or FIG. 2B), the subdirectories of RDR will be referred to herein as "layers." Each layer may contain files with different file extensions. For example layer L2 may contain files with the .doc., .jpeg., .ppt, etc., extensions. Each of the layers can be activated or deactivated as will be more fully described below. When a layer is activated, the files contained in the activated layer should appear as being contained in the virtual file system. In contrast, when a layer is deactivated, the files contained in the deactivated layer should not appear as being contained in the virtual file system. The foregoing description of the virtual file system shown in FIG. 3A presumes that all layers of RDR are active.

A user can activate or deactivate a layer using the layer manager 18 shown in FIG. 1. In one embodiment, layer manager 18 can present a layer manager GUI (not shown) which lists all layers by name that are contained within the file system, along with an indication of which layer is active or not. A user can activate or deactivate a layer using the layer manager GUI. In the example embodiment described above, the layer manager GUI when presented by layer manager 18, would identify layers L1 and L2 as being activated. As an aside, layers L1 and L2 may be identified in the layer manager GUI by names (e.g., L1 may be identified by "Confidential Matters" and L2 may be identified by "Daily Morning Production") that were previously assigned by the user.

Layer manager 18 can send a deactivation or activation command to driver 14, which includes an identity of the layer to be deactivated or activated, in response to receiving a corresponding command from the user via the layer manager GUI. The layer can be directly or indirectly identified in the command. When indirectly identified (e.g., by a user given name such as "Daily Morning Production"), driver 14 may need to access metadata layer 20 in order to identify the layer (e.g., layer L2, which corresponds to "Daily Morning Production") as it exists in the file system. In response to receiving a layer deactivation command, driver 14 should remove all entries from the activation list (e.g., the activation list shown in FIG. 4A) that correspond to the identified layer. In one embodiment, each entry that contains a redirect path component, which in turn contains the identified layer, is removed from the activation list. In contrast, driver 14 would add one or more entries to the activation list that correspond to the identified layer that is received in a command to activate a layer. Driver 14 may need to access metadata layer 20 in order to identify entries that need to be added to the activation list in response to receiving a command to activate a layer.

Figure 3C:
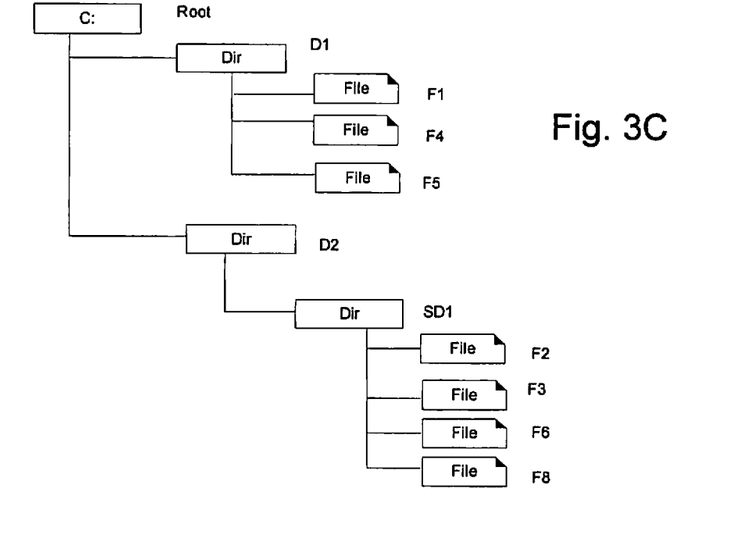
Figure 4B:
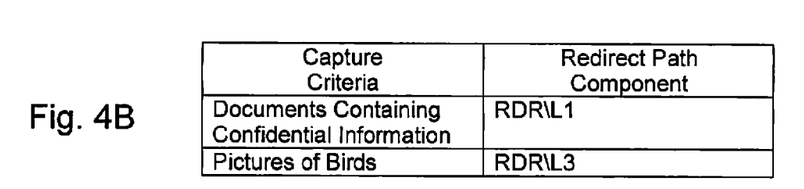

To illustrate the foregoing, note the activation list of FIG. 4A shows that layer L2 is active since the activation list includes an entry that contains the redirect path component corresponding to layer L2 (i.e., the redirect path component that contains the L2 name). Moreover, FIG. 3A shows that layer L2 is active since the files of layer L2 (i.e., F7) are also shown as being contained in the virtual file system of FIG. 3A. Suppose a user seeks to deactivate layer L2. Layer manager 18, in response to receiving input from the user via the layer manager GUI, generates and sends a command to deactivate layer L2. Driver 14 receives the command and removes the activation list entry that contains the redirect path component that includes the identified layer (e.g., layer L2). FIG. 4B illustrates the activation list shown in FIG. 4A in response to receiving the command from layer manager 18 to deactivate layer L2. As seen, the activation list no longer contains an entry with a redirect path component that contains "L2." With layer L2 deactivated, driver 14 would no longer modify file system requests that are directed to files with associated external information (e.g., file creation time) that matches the capture criteria "Data Created Between 8:00 and 11:30 AM." As an aside, by deactivating layer L2, the virtual file system presented to process 12 or to a user via a browser GUI, would also be modified. FIG. 3C illustrates the virtualized file system of FIG. 3A after deactivation of layer L2.

Layer manager 18 can generate a single command to activate or reactivate layer L2, which is subsequently sent to driver 14, in response to user input via the layer manager GUI. In response to receiving this command, driver 14 may access layer metadata 20 using the identification of the layer to be activated or reactivated. Layer metadata 20 may include data structures, each one of which corresponds to an active or deactivate layer. Driver 14 accesses layer metadata 20 with the identity of layer (e.g., L2) to be activated or reactivated. The data structure corresponding to layer L2 should identify the capture criteria/redirect path component pair to be added as entries to the activation list. If a user reactivates layer L2 via layer manager 18, the activation list would return to the state shown in FIG. 4A.

In the process of FIG. 5, driver 14 compares capture criteria with external information in order to determine whether a match exists therebetween, and if a match exists, the file path is modified by adding a redirect path component (see, e.g., step 58). The external information, as its name implies, is information about the data contents of the file to be created that is external to the data contents of the file. The external information can take many different forms. In one embodiment, the external information may be a component of the file's metadata. For example, a capture criterion may be defined as all files created by a specific person as defined in the files' metadata. If driver 14 receives a file system request to create a file, and the metadata for the file indicates that the file was created to store data that was created by the specified person, then driver 14 will modify the file path of the file system request to include the redirect path component that is mapped to the "specified person" capture criteria.

The capture criteria may be defined to be all files that are read-only. In this situation, if driver 14 receives a file system request to create a file, and metadata for the file indicates that the file is to store data that is read-only, driver 14 will modify the path of the file system request to include the redirect path component that is mapped to the "read-only" capture criteria.

The capture criteria may be defined to be all files created during a certain time period (e.g., daily between 8:00 AM and 11:30 AM). If driver 14 receives a file system request to create a file to store data, and the file's metadata includes a file creation time stamp set to 10:00 AM thus indicating that the data to be stored was created at 10:00 AM, then driver 14 will modify the path of the file system request to include the redirect path component that is mapped to this capture criterion.

The capture criteria may be defined using several components of the file's metadata. For example, the capture criteria may be defined to be all files that are read-only AND contain data created by a specific person. In this situation, if driver 14 receives a file system request to create a file to store data and the metadata for the file indicates that the data of the file is read-only AND created by the specified person, then driver 14 will modify the file path of the request to include the redirect path component that is mapped to this capture criteria. It is noted that logical operators alternative to AND may include OR, or ANDNOT, etc.

The external information associated with a file and used to determine whether a file path is to be modified, can take form in information other than one or more file metadata components. For example, the capture criteria may be defined as a time period (e.g., daily between 8:00 AM and 11:30 AM) when driver 14 receives a request to create a file. In this situation, if driver 14 receives a request to create a file to store data and the request is received by the driver at 11:00 AM, driver 14 will modify the file path of the request to include the redirect path component that is mapped to this capture criterion.

The external information associated with a file and compared to capture criteria, may be information that describes the data to be stored in the file. To illustrate, the capture criteria may be defined as documents containing confidential information. If driver 14 receives a request to create a file to store a .doc document, and the .doc document contains confidential information, driver 14 will modify the file path of the request to include the redirect path component that is mapped to this capture criterion. The external information (e.g., an indication of whether the document contains confidential information) that is compared to the capture criteria may be provided to driver 14 by a user or by a software process (not shown) executing on a CPU. For example, when driver 14 receives a request to create a file that will store a .doc document, driver 14 may initiate a process that word searches the .doc document for the words "confidential information." The process will eventually provide an indication to driver 14 of whether the .doc document contains the words "confidential information." If the .doc document does contain "confidential information," then driver 14 will modify the file path of the request to include the redirect path component that is mapped to the "confidential" capture criterion. Alternatively, the metadata for the file or the .doc document may indicate that the .doc document contains confidential information. In this situation, driver 14 could compare the capture criteria with the metadata component that indicates whether the .doc document contains confidential information in order to determine whether the file path should be modified in accordance with step 58 of FIG. 5. For purposes of explanation only, external information that describes data of a file should not be limited to only the file extension or information that describes the type of file data (i.e., whether the file data is JPEG, MP3, etc.).

The capture criteria may be defined as pictures with a particular content. For example, the capture criteria may be defined as pictures of beaches, mountains, birds, or particular people. To illustrate, suppose a capture criteria is defined to be "picture of a bird" when driver 14 receives a request to create a file to store a .jpeg picture. Further, the .jpeg picture primarily contains a bird. In this situation, driver 14 will modify the file path of the request to include the redirect path component that is mapped to the "picture of a bird" capture criterion. The external information (e.g., an indication of whether the picture primarily contains a bird) that is compared to the capture criteria may be provided to driver 14 by a user or by a software process executing on a CPU. For example, when driver 14 receives a request to create a file that will store a .jpeg picture, driver 14 may initiate a process that analyzes the picture to see if it primarily contains a bird. Eventually the process will provide an indication to driver 14 of whether the .jpeg picture contains a bird. If the .jpeg picture does primarily contain a bird, then driver 14 will modify the file path of the request to include the redirect path component that is mapped to the "picture of a bird" capture criterion. Alternatively, when driver 14 receives a request to create a file to store a .jpeg picture, driver 14 could directly or indirectly generate a user interface for display on a monitor, which asks a user whether the .jpeg picture contains a bird (or a mountain, or a beach, or particular person, or any other capture criteria defined in entries of the activation list of FIG. 4A). User input to this interface can be used as external information and compared to capture criteria by driver 14 in order to determine whether the file path of the request should be modified by adding a redirect path component that is mapped to the capture criteria.

The capture criteria may be defined to be a combination of metadata and information other than metadata. For example, the capture criteria may be defined as a time period (e.g., daily between 10:00 AM and noon) when the driver receives a request to create a file to store data AND the data was created by a specific person as defined in metadata. In this situation, if driver 14 receives a request to create a file to store data, the request was received by driver 14 at 11:00 AM and the file's metadata indicates that the file was created to store data that was created by the specified person, then driver 14 will modify the file path of the request to include the redirect path component that is mapped to this capture criteria. It is noted that logical operators alternative to AND may include OR, or ANDNOT, etc.

Figure 6A:
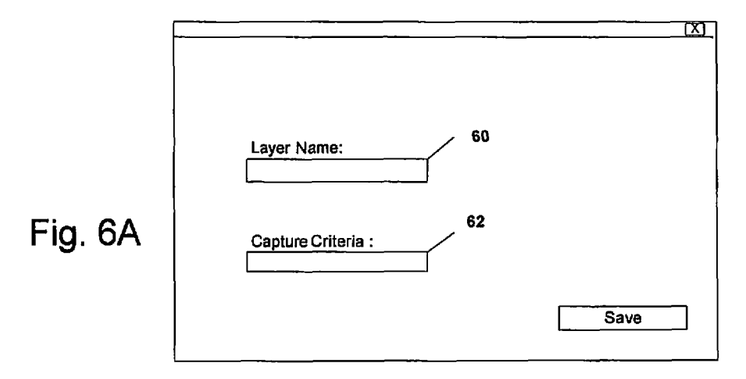
FIGS. 6A and 6B illustrate graphical representations of a user interface employed in the computer system of Figure.
Figure 6B:
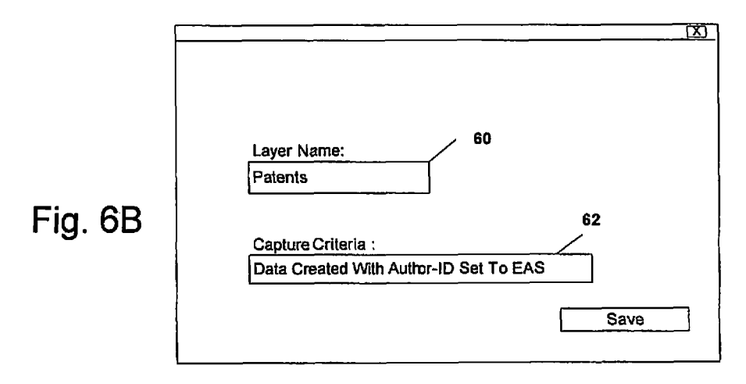

As noted above, layer manager 18 enables a user to create new layers within the RDR directory show in FIG. 2A. FIG. 6A illustrates a graphical representation of an example interface that is provided by layer manager 18, which enables a user to create a new layer within the RDR directory. The interface includes fields 60 and 62 into which a user can enter information for defining the new layer and the capture criteria thereof. FIG. 6B illustrates the interface of FIG. 6A after the user enters "Patents" as the layer name and "all files with metadata author-ID set to EAS" as the capture criteria.

Figure 2C:
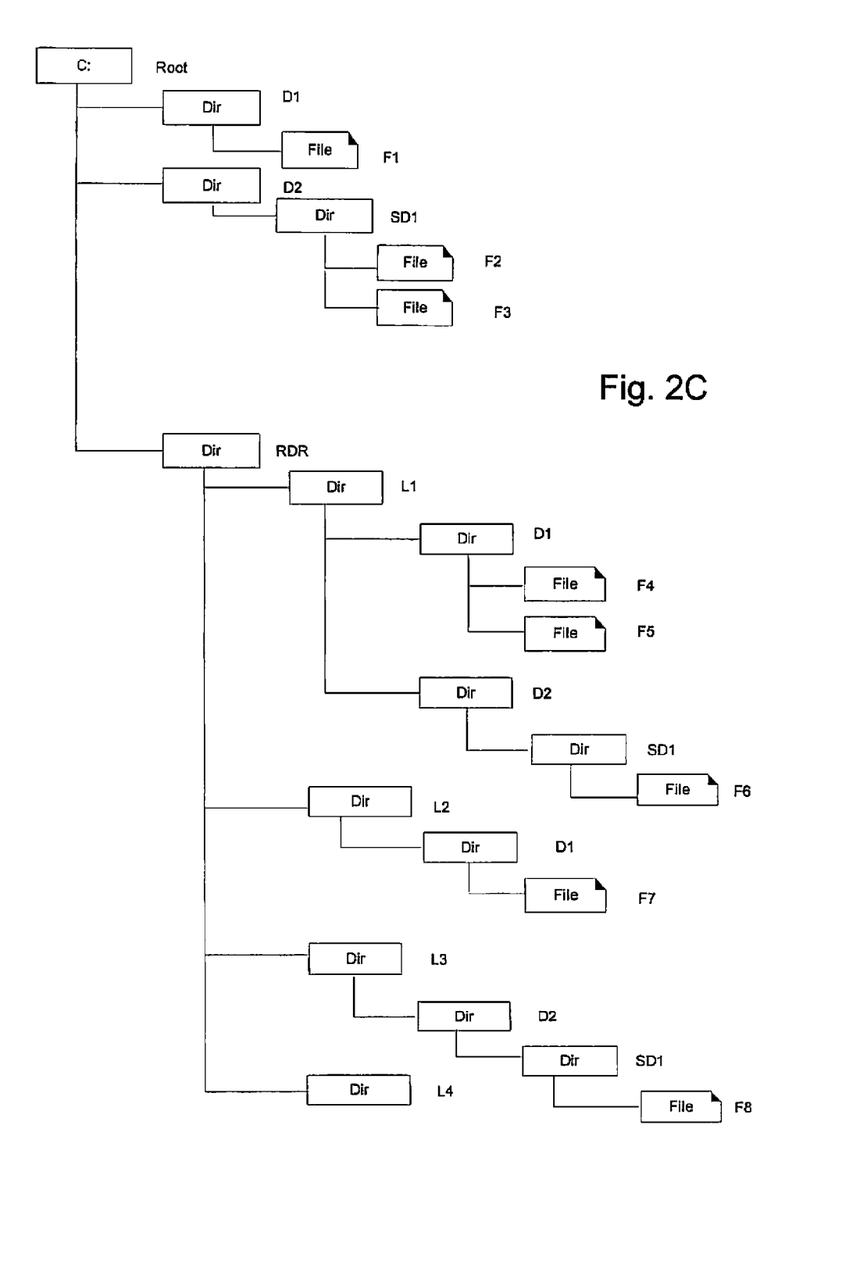
Figure 7:
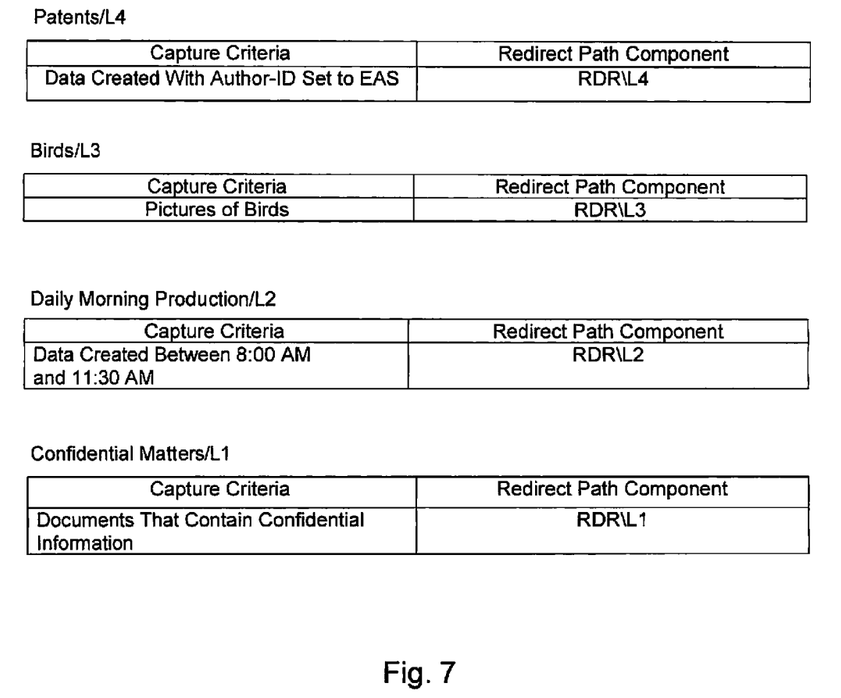
FIG. 7 illustrate graphical representations of data structures employed in the computer system of FIG. 1

Once the user has finished defining a new layer and its capture criteria, layer manager 18 can store the entered information into a newly created data structure within layer metadata 20. FIG. 7 illustrates a graphical representation of data structures stored in layer metadata 20, including the newly created data structure named "Patents," the user given name entered into field 60 of FIG. 6B. Further, a new layer is added to the file system of FIG. 2A in response to activating the new layer. FIG. 2C illustrates the file system shown in FIG. 2A after activation of the new layer (i.e., L4) defined by the information added to the interface of FIG. 7B. No files are initially stored within layer L4. Going forward, any newly created files that contain data that was created by EAS according to the author-ID of the file's metadata, will be captured and stored in activated layer L4 in accordance with the process shown in FIG. 5, even though file system requests generated by process 12 may specify that the newly created files are to be stored in directory D3 of the virtual file system shown in FIG. 3A.

Figure 4C:
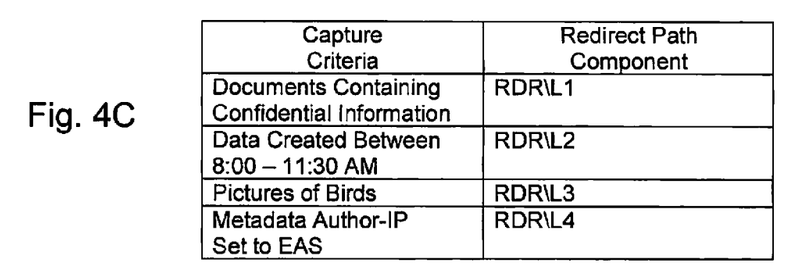

The data structures of FIG. 7 contain information relevant to respective layers, which is used by driver 14 when activating or deactivating a layer. For example, the newly created data structure links layer L4 to "Patents," the name assigned to the layer by the user (see FIG. 6B). Each data structure will identify the capture criteria. Each data structures will also list the redirect path component to be added to the activation list (see FIG. 4A) when a layer is activated. For example, if driver 14 receives a command to activate layer L4, in accordance with the process described above, driver 14 would access the newly created data structure in layer metadata 20 and retrieve the capture criteria and redirect path component contained therein for layer L4. Driver 14 would then modify the activation list to include a new entry that corresponds to layer L4. FIG. 4C illustrates the activation list of FIG. 4A after driver 14 adds an entry for layer L4.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:

receiving a first request to create a first file, which stores a first data object, in a file system, wherein the first request comprises a first file system path;

receiving first information that describes the first data object, wherein the first information does not identify a data type of the data in the first data object;

accessing a list using the first information, wherein the list comprises a plurality of redirect file system path components, and wherein an entry in the list associates one or more capture criteria with a first redirect file system path component of the plurality of redirect file system path components;

selecting the first redirect file system path component, in response to the first information satisfying the one or more capture criteria associated with the first redirect file system path component by the list;

modifying the first file system path by adding the first redirect file system path component to the first file system path, wherein the modifying is performed by a computer system configured to implement a file system filter driver;

detecting that a first layer has been deactivated, wherein the first layer is associated with the entry in the list;

receiving a second request to create a second file, which stores a second data object, in the file system, wherein the second request comprises a second file system path;

receiving second information that describes the second data object, wherein the second information satisfies the one or more capture criteria associated with the first redirect file system path; and inhibiting modification of the second file system path, in response to the detecting that the first layer has been deactivated.

2. The method of claim 1 further comprising:

receiving a third request to create a third file, which stores a third data object, in the file system, wherein the third request comprises a third file system path;

receiving third information that describes the third data object;

selecting a third redirect file system path component that is mapped to the third information in the list;

modifying the third file system path by adding the third redirect file system path component to the third file system path.

3. The method of claim 2 further comprising:

sending the first request, including the modified first file system path, to a file system manager for processing;

sending the third request, including the modified third file system path, to the file system manager for processing.

4. The method of claim 1 wherein the first information is defined as documents that contain confidential information.

5. The method of claim 1 wherein the first information is defined as pictures with a particular content.

6. The method of claim 1, further comprising:
detecting that the first layer has been activated; and
adding the entry to the list in response to detecting that the first layer has been activated.

7. A non-transitory computer readable medium (CRM) comprising instructions, wherein a computer system implements a method in response to executing the instructions, the method comprising:
receiving a first request to create a first file, which stores a first data object, in a file system, wherein the first request comprises a first file system path;
receiving first information that describes the first data object, wherein the first information does not identify data type of the data in the first data object;
accessing a list using the first information, wherein the list comprises a plurality of redirect file system path components, and wherein an entry in the list associates one or more capture criteria with a first redirect file system path component of the plurality of redirect file system path components;
selecting the first redirect file system path component in response to the first information satisfying the one or more capture criteria associated with the first redirect file system path component by the list that is mapped to the first information in the list;
modifying the first file system path by adding the first redirect file system path component to the first file system path;
detecting that a first layer has been deactivated, wherein the first layer is associated with the entry in the list;
receiving a second request to create a second file, which stores a second data object, in the file system, wherein the second request comprises a second file system path;
receiving second information that describes the second data object, wherein the second information satisfies the one or more capture criteria associated with the first redirect file system path; and
inhibiting modification of the second file system path, in response to the detecting that the first layer has been deactivated.

8. The non-transitory CRM of claim 7 wherein the method further comprises:
receiving a third request to create a third file, which stores a third data object, in the file system, wherein the third request comprises a third file system path;
receiving third information that describes the third data object;
selecting a third redirect file system path component that is mapped to the third information in the list;
modifying the third file system path by adding the third redirect file system path component to the third file system path.

9. The non-transitory CRM of claim 8 wherein the method further comprises:
sending the first request, including the modified first file system path, to a file system manager for processing;
sending the third request, including the modified third file system path, to the file system manager for processing.

10. The non-transitory CRM of claim 7 wherein the first information is defined as documents that contain confidential information.

11. The non-transitory CRM of claim 7 wherein the first information is defined as pictures with a particular content.

* * * * *